United States Patent

Marttinen et al.

[11] Patent Number: 6,028,864
[45] Date of Patent: Feb. 22, 2000

[54] DIGITAL DATA TRANSMISSION NETWORK AND METHOD FOR OPERATING SAME

[75] Inventors: Tapio Marttinen, Müenchen; Markku Korpi, Starnberg, both of Germany

[73] Assignee: Siemens Aktiengesellschaft, Munich, Germany

[21] Appl. No.: 08/984,541

[22] Filed: Dec. 3, 1997

[30] Foreign Application Priority Data

Dec. 5, 1996 [DE] Germany ............... 196 50 525

[51] Int. Cl.[7] ............... H04L 12/40; H04J 3/16
[52] U.S. Cl. ............... 370/403; 370/465
[58] Field of Search ............... 370/252, 251, 370/403, 389, 465, 466, 258, 452; 340/825.05

[56] References Cited

U.S. PATENT DOCUMENTS

| | | | |
|---|---|---|---|
| 5,003,533 | 3/1991 | Watanabe | 370/258 |
| 5,425,022 | 6/1995 | Clark | 370/360 |
| 5,544,153 | 8/1996 | Marttinen | 370/403 |
| 5,878,042 | 3/1999 | Fraas | 370/355 |

FOREIGN PATENT DOCUMENTS

WO 89/12950  12/1989  WIPO.
WO 93/21714  10/1993  WIPO.

*Primary Examiner*—Ajit Patel
*Assistant Examiner*—Ricardo M. Pizarro
*Attorney, Agent, or Firm*—Hill & Simpson

[57] ABSTRACT

In a method for operating a digital data transmission network, and in a digital data transmission network operating according to the method, in an initial part of a transmission event between a control unit and at least one user unit in the network, a first data block containing data and a second data block containing data are transmitted from the control unit to the user unit. In the control unit, a first reference number is prescribed as a first transmission parameter in the first data block, which identifies a number of bit places provided for subsequent data transmission of the data contained in the first block from the user unit in a first useful channel. The control unit also prescribes a second reference number as a second transmission parameter in the second data block, identifying a number of bit places for subsequent data transmission of the data contained in the second block from the user unit in a second useful channel. The first and second data blocks are transmitted from the control unit to the useful unit and the first and second reference numbers are stored in the user unit. Following an end of the transmission event, the user unit employs the number of bit places indicated by the first reference number for data transmission of the data contained in the first data block in the first useful channel, and employs the number of bit places indicated by the second reference number for data transmission in the second useful channel of the data contained in the second data block.

15 Claims, 5 Drawing Sheets

DIGITAL DATA TRANSMISSION NETWORK AND METHOD FOR OPERATING SAME

BACKGROUND OF THE INVENTION

1. Field of the Invention

The present invention is directed to a method for the operation of a digital data transmission network with which control and/or communication data are transmitted, and to a data transmission network operating according to the method.

2. Description of the Prior Art

PCT Application WO 93/21714 discloses a method for the transmission of digital data wherein a control unit and a number of user units are connected to form a ring network. Data blocks having a predetermined number of bit places are communicated in this ring network. These data blocks are also referred to as frame or data packets. There is a useful data part in the data blocks whose bit places are employed in useful channels in the data transmission. For example, digital voice data in telephony, digitized video data and digital data of a data processing system are communicated in the useful channels. Commands are exchanged between the control unit and the user units, or among the user units, via a control channel (command channel).

A disadvantage of this known method is that the useful channels are already allocated to the future applications during design of the data transmission network. A reaction to a momentary requirement which may occur during operation of the data transmission network is possible only to an extremely limited extent.

SUMMARY OF THE INVENTION

An object of the present invention is to provide a simple method for the operation of a digital data transmission network that allows a modification of the transmission parameters during operation.

This object is achieved in accordance with the invention in a met hod which is based on the resignation that, given data blocks having a predetermined number of bit places, transmission rates can be modified in individual useful channels by using one or more bit places for the transmission in a particular useful channel. An adaptation to the requirement in the data transmission network can be achieved by varying the number of bit places in a useful channel. The adaptation, however, must be made known in the entire network.

In the method of the invention, a data word in the data block therefore defines a transmission parameter for one of the useful channels. The number of bit places to be utilized in the individual useful channels is successively communicated for each useful channel as a transmission parameter in a first part of a transmission procedure. The communication of useful data in the useful data part of the data blocks in the invention ensues without limitation while the transmission parameters are being communicated. The number of bit place s communicated as a transmission parameter for the respective useful channel is first only stored in each user unit and is not yet employed in the transmission of the communication data in the respective useful channel.

In the inventive method, data blocks having a predetermined number of bit places are communicated between a control unit and at least one user unit, each data block containing a data word which defines a transmission parameter for one of at least two useful channels in the network, and the data block also contains a useful data part having bit places which are employed for data transmission in the useful channels. A first data block and a further data block are communicated in a first part of a transmission event for data blocks. The first data block contains a reference number of bit places, prescribed by the control unit as a transmission parameter, which indicates how many bit places are provided for future data transmission within the first useful channel. The further data block also contains its own reference number of bit places, also prescribed by the control unit as a transmission parameter, which indicates how many bit places are provided for future data transmission in the further useful channel. The reference number associated with the first useful channel as well as the reference number associated with the second useful channel are stored in a user unit which receives the data block and the further data block. Following the end of the transmission event, the number of bit places defined by the reference number associated with the first useful channel is employed for the data transmission in the first useful channel, and the number of bit places defined by the reference number associated with the further channel is employed for data transmission in the further useful channel.

The number of bit places defined by the first reference number is employed for data transmission in the first useful channel and the number of bit places defined by the second (further) reference number is employed for the data transmission in the second (further) useful channel only after the end of the transmission procedure. This guarantees that no data are lost when the transmission parameters are modified. The use of the new transmission parameters in the transmission ensues only after the new transmission parameters are known in the entire data transmission network.

The transmission parameters are prescribed by the control unit, for example upon demand of the user units. The prescription expediently ensues such that channels having an identical reference number of bit places are arranged side-by-side in a group.

In one exemplary embodiment of the invention, a further data word in the data block is employed for identifying the useful channels. During the transmission event, accordingly, the first useful channel is referenced in the first data block, since the first data block contains the transmission parameters for the first useful channel. The second useful channel is referenced in the second data block. As a result of this measure, the user units can be constructed in a simple way since the useful channel for which a data block contains a transmission parameter can be directly taken from the data block by a user unit.

In a further exemplary embodiment of the invention, the control unit and the user unit form a data transmission network with ring a structure in which the data blocks are communicated in one direction. This data transmission network preferably has the properties of the data transmission network set forth in the above-noted PCT Application WO 93/21714. In this network, the number of bit places that can be simultaneously transmitted in the ring network is equal to the predetermined number of bit places in the data block. This is achieved by a memory that buffers the bit places that have already arrived in the control unit before the bit places belonging to the same data block were completely transmitted. Access to the bit places of the data block is greatly simplified as a result of this measure. Given a simple access, however, short access times also occur for reading or writing a bit place. If the delays of the user units and of the control unit in the communication of a bit place are shorter than or approximately equal to the time between the transmission of two successive bit places, then time-critical applications can also be realized. Moreover, the number of user units in a ring network can be increased with a given data block length.

In a second part of the transmission event, a user frame length is communicated for each channel as a transmission parameter. The user frame length is a number of bit places predetermined by the control unit that are successively transmitted in the respective useful channel in one or more data blocks. The user frame length is employed for driving the devices that process the useful data. The drive of the connected devices can be implemented in a simple way in the user units by means of the user frame length.

In one exemplary embodiment of the method of the invention, modulo values are communicated in a third part of the transmission event, these indicating a variable offset from transmission event to transmission event. This allows the user frame length to be freely selected; accordingly, the number of data blocks in a transmission event need not be integrally divisible by the user frame length, or need not be a multiple of the user frame length given more than two bit places in a useful channel. The need to employ filler bits is also eliminated.

In a further exemplary embodiment, two data blocks are communicated in a fourth part of the transmission event, an offset for the first or for the further useful channel being contained therein. The offset is employed for driving the devices connected to the user units. With reference to the offset, the user units can determine when a data word from the connected device appears.

The numbering employed in the presentation of the parts of the transmission event is not a limitation for a chronological succession of the parts of the transmission event. A successive execution of the four parts of the transmission event is usually not critical since a few microseconds or even milliseconds of delay can usually be accepted at the beginning of a communication connection via one of the useful channels. When a very fast modification of the transmission parameters occurs, then the four parts of the transmission cycle can be combined such that the transmission parameters of all parts are contained in a data block.

If the transmission event is cyclically repeated, then protocols for starting and ending a transmission event are eliminated, again allowing the user units and the control unit as well to be constructed in a simple way.

When, in a further exemplary embodiment, the momentary part, for example the first part, of the transmission event is also referenced in the data block, then measures for further-processing can be undertaken in the user units on the basis of this referencing. The user units, accordingly, need not be able to independently identify the momentary part of the transmission event, so that the control of the user units is simplified.

If a reference number of bit places having the numerical value of zero identifies an unused useful channel, then the "insertion" of useful channels can be realized. Although registers are provided in the user units for the inserted useful channel, bit places in the data block are only occupied when they are in fact required.

As noted above, the invention is also directed to a digital data transmission network for the transmission of control and/or communication data and, in particular for the implementation of the above-described method. In accord therewith, the aforementioned technical aspects are also present in the digital data transmission network.

An especially simple structure of the data transmission network is achieved if each user unit contains a memory for each useful channel for storing the number of future bit places of the appertaining useful channel. Addresses at which the respective useful channel begins in the data block can be determined by means of simple adder circuits. If the stored values and the calculated addresses are transferred into a further intermediate memory at the end of the transmission event, then the bit places in the data block at which the useful information of the respective channel also appears can be exactly identified for each of the useful channels, using a simple comparator circuit.

DESCRIPTION OF THE PREFERRED EMBODIMENTS

Figure 1:
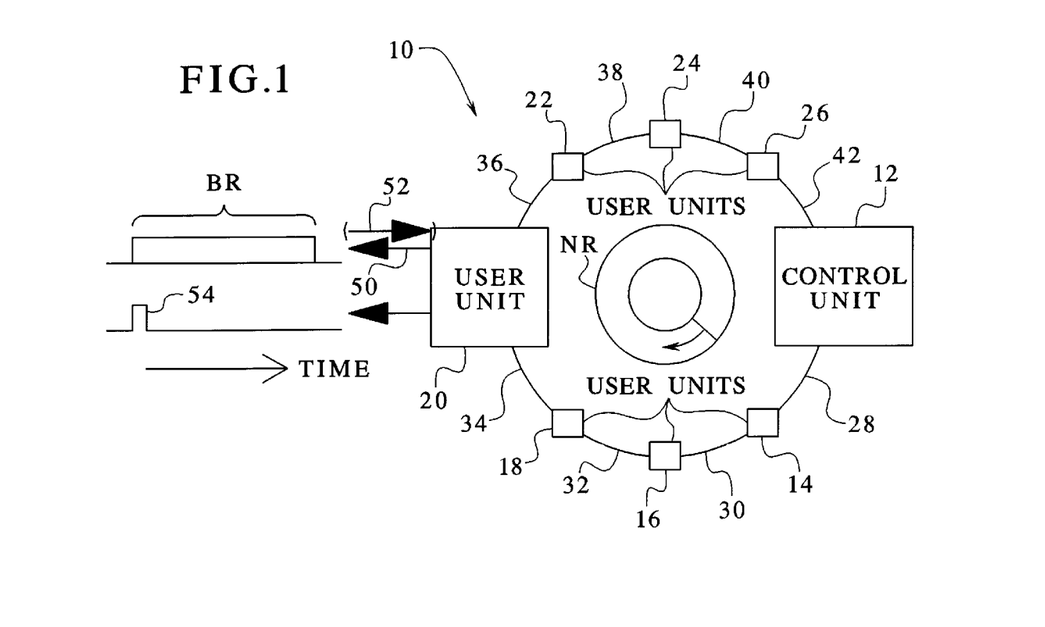
FIG. 1 is a schematic illustration of a data transmission network constructed and operating in accordance with the invention.

FIG. 1 shows a schematic illustration of a data transmission network 10 for the transmission of digital communication and/or control data between a control unit 12 and user units 14 through 26. The user units 14 through 26 are arranged on one floor of a building and can exchange communication and/or control data with each other. Via the control unit 12, the user units 14 through 26 can also exchange data with other data transmission networks that, for example, are set up in a different floor of the building. In addition to this switching function, the control unit 12 also has a control function that shall be discussed later.

Various devices that require specific transmission protocols can be connected to the user units 14 through 26. For example, these transmission protocols can be protocols for the transmission of digital voice signals when telephoning, protocols for the transmission of digital radio data, protocols for the transmission of digital image data, simple analog or digital control protocols, analog sensor protocols, protocols for the transmission of digital data between various data processing systems and many more.

The control unit 12 and the user units 14 through 26 are connected ring-like with by transmission lines 28 through 42. A network frame NR whose components are explained with reference to FIG. 2 constantly circulates on the transmission lines 28 through 42. If a device connected to the user units 14 through 26 are communicated to or away from the user units 14 through 26 with the assistance of the useful frame NR. Useful channels in the network frame that, ultimately, are exactly defined time slots in which a predetermined number of data bits is transmitted are employed for the communication.

FIG. 1 schematically shows a user frame BR that illustrates the data word of a device connected to the user unit 20.

The user frame BR can be sent to the device, as indicated by arrow 50. At the same time or alternatively thereto, the user frame BR also can be sent from the device, as indicated by arrow 52. The user unit 20 also generates a synchronization pulse 54 when a new user frame BR is to be sent to the device. When the device is to send a user frame BR to the user unit 20, it waits for the synchronization pulse 54.

Figure 2:
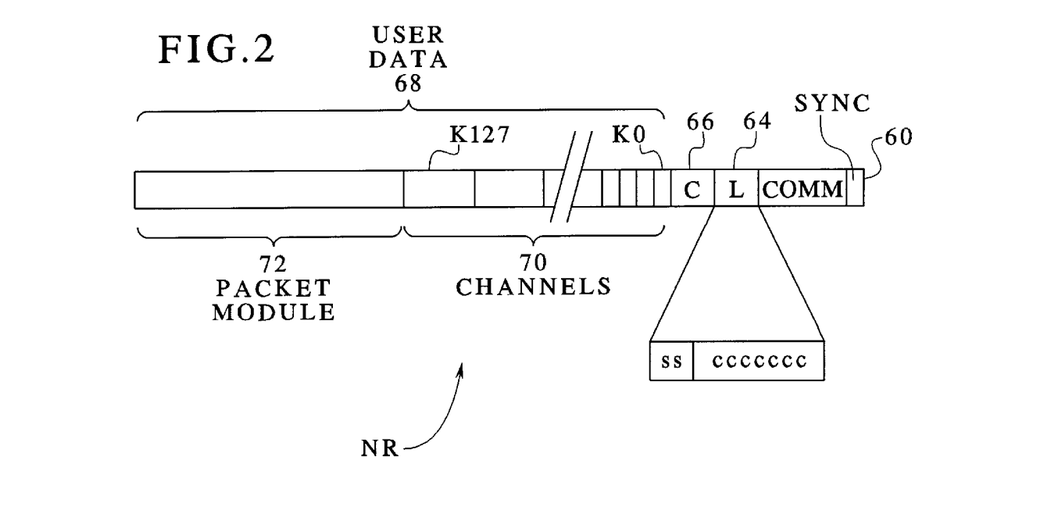
FIG. 2 shows the components of a network frame communicated in the data transmission network in accordance with the invention.

FIG. 2 shows the components of a network frame NR transmitted in the data transmission network 10 according to FIG. 1. The network frames NR are transmitted with a rigidly prescribed frame frequency FR, so that a rigidly prescribed frame duration RD exists. Each transmitted network frame NR has a precisely predetermined number of bit places that are communicated according to a predetermined bit frequency fB, for example 155.52 Mbps (million bits per second) given 1215 bit places per network frame NR.

The network frame NR contains a synchronization part 60 that serves for the determination of the exact beginning of the network frame NR. A command part 62 in which commands are exchanged between the user units 14 through 26 and the control unit 12 (see FIG. 1) according to a command language follows the synchronization part 60 in time. The command part 62 is also employed when a user unit 14 through 26 (see FIG. 1) requests a new useful channel.

The commands part 52 is followed by a designation data word 64 in which seven bit places c are employed for the identification of one of 128 possible channels and in which two further bit places s are employed for the designation of one of four different sub-cycles UZ1 through UZ4. The sub-cycles UZ1 through UZ4 are components of a main cycle HZ for the modification of the transmission parameters in the data transmission network 10 (see FIG. 1). The main cycle HZ and the sub-cycles UZ1 through UZ4 are explained in greater detail later with reference to FIGS. 5a and 5b.

A parameter data word 64, in which exactly one transmission parameter for the useful channel referenced in the reference data word 64 is contained, is communicated spatially next to the reference data word 64, or chronologically following the reference data word 64. The specific transmission parameter in the parameter data words 66 is defined by the value of the bit places s in the reference data word 64. The network frame NR also contains a useful data part 68 having a constant length. Useful data that are communicated via one of the useful channels K0 through K127 are located in a first part 70 of the useful data part 68. The part 70 differs in length dependent on the number of useful channels K0 through K127 used at the moment and dependent on their number of employed bit places.

A remaining part 72 of the useful data part 68, by contrast to the connection-oriented communication in the part 70, is employed for a connectionless communication of useful data in one of the known packet switching methods, for example ATM (asynchronous transfer mode).

Unused channels have a length of zero bits, so that the total useful data part 68 can be utilized for the transmission in the packet mode in the extreme case when none of the channels is used. The proportion of the part 72 decreases with increasing size of the part 70 for the useful channels K0 through k127.

Figure 3:
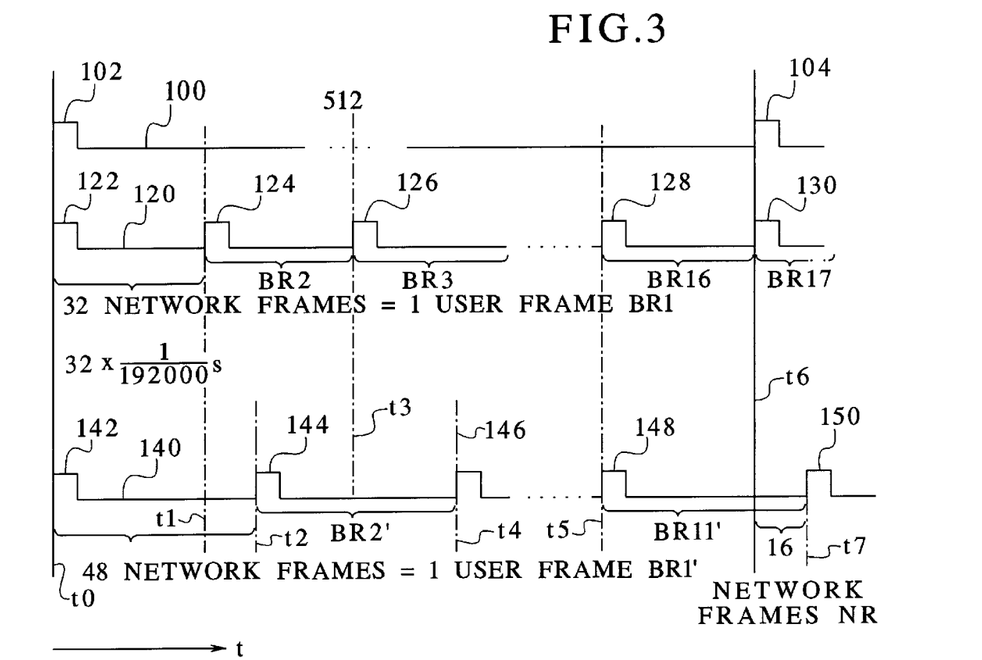
FIG. 3 shows time curves for explaining the terms "user frame" and "variable offset" in accordance with the invention.

FIG. 3 shows three time curves 100, 120 and 140 that begin at a common point in time t0. The main cycle HZ, which is composed of the four sub-cycles UZ for respectively 128 channels, requires a total of 512 network frames NR. The time between a pulse 102 of the time curve 100 and a pulse 104 of the time curve 100 at a point in time t6 corresponds exactly to the time for the communication of 512 network frames NR. If a useful channel under consideration has the length of one bit place and if a user frame BR has a length of 32 bit places, then a single user frame BR is communicated by 32 network frames NR. A pulse 122 of the time curve 120 at point-in-time t0 identifies the beginning of a first user frame BR1. At a point-in-time t1 after the point-in-time t0, or at a point-in-time t3 after the point-in-time t2, a second user frame BR2, or a third user frame BR3 begins, respectively, as indicated by a pulse 124 or 126 of the time curve 120. After the transmission of a 16th user frame BR16, beginning at a point-in-time t5 after the point-in-time t3 (see pulse 128 of the time curve 120), 512 network frames MR have already been communicated. A new user frame BR17 thus begins at point-in-time t6, as indicated in pulse 130 of the time curve 120. An offset between the beginning of the next user frame BR17 and the beginning of the main cycle HZ does not occur.

In the time curve 140, the useful channel under consideration again has a length of one bit place. A user frame BR1', by contrast, has 48 bit places so that 48 network frames are employed for the communication of the user frame BR1'. The first user frame BR1' is communicated beginning from point-in-time t0 up to a point-in-time t2 that lies between the point-in-time t1 and the point-in-time t3. The communication of the first bits of the second user frame BR2' is illustrated by a pulse 144 of the time curve 140 at point-in-time t2. A pulse 146 at a point-in-time t4 that lies between the points-in-time t3 and t5 identifies the beginning of the third user frame BR3'. The first main cycle HZ is already ended during the communication of an 11th user frame BR11', beginning at point-in-time t5 (see pulse 148 of the time curve 140). Another sixteen network frames NR must be communicated to complete the communication of the user frame BR11', so that the communication of a further user frame BR' can only begin at a point-in-time t7 lying after the point-in-time t6. An offset of sixteen network frames NR consequently occurs given the time curve 140 within a main cycle HZ. The offset can be calculated by means of a modulo operation, with the number of network frames NR per main cycle HZ being calculated from the product of the number of bit places in a user frame BR' and the number of bit places employed in the appertaining useful channel. The offset must be known, at least in the user units 14 through 26 in which the appertaining channel is accessed, so that the data transmission can be implemented error-free.

Figure 4:
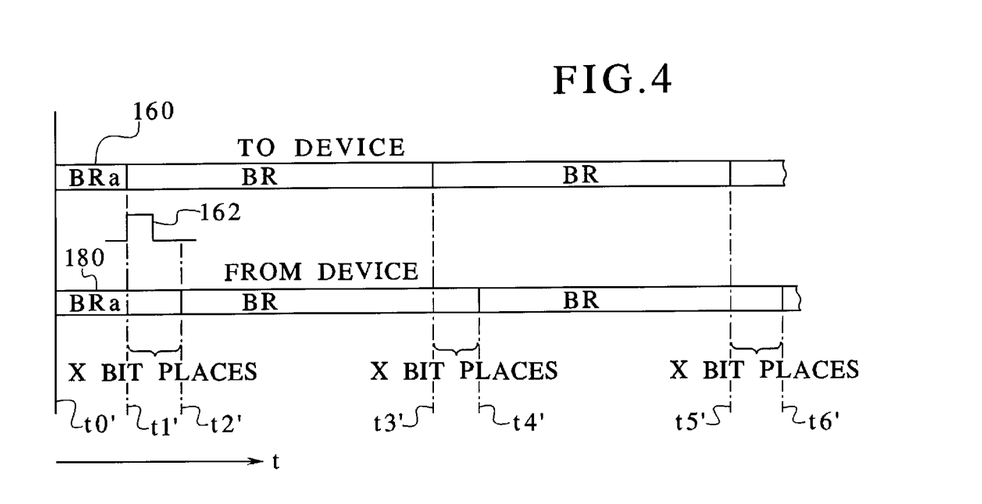
FIG. 4 shows time curves for explaining a fixed offset between input data word and output data word in a useful channel in accordance with the invention.
Figure 5A:
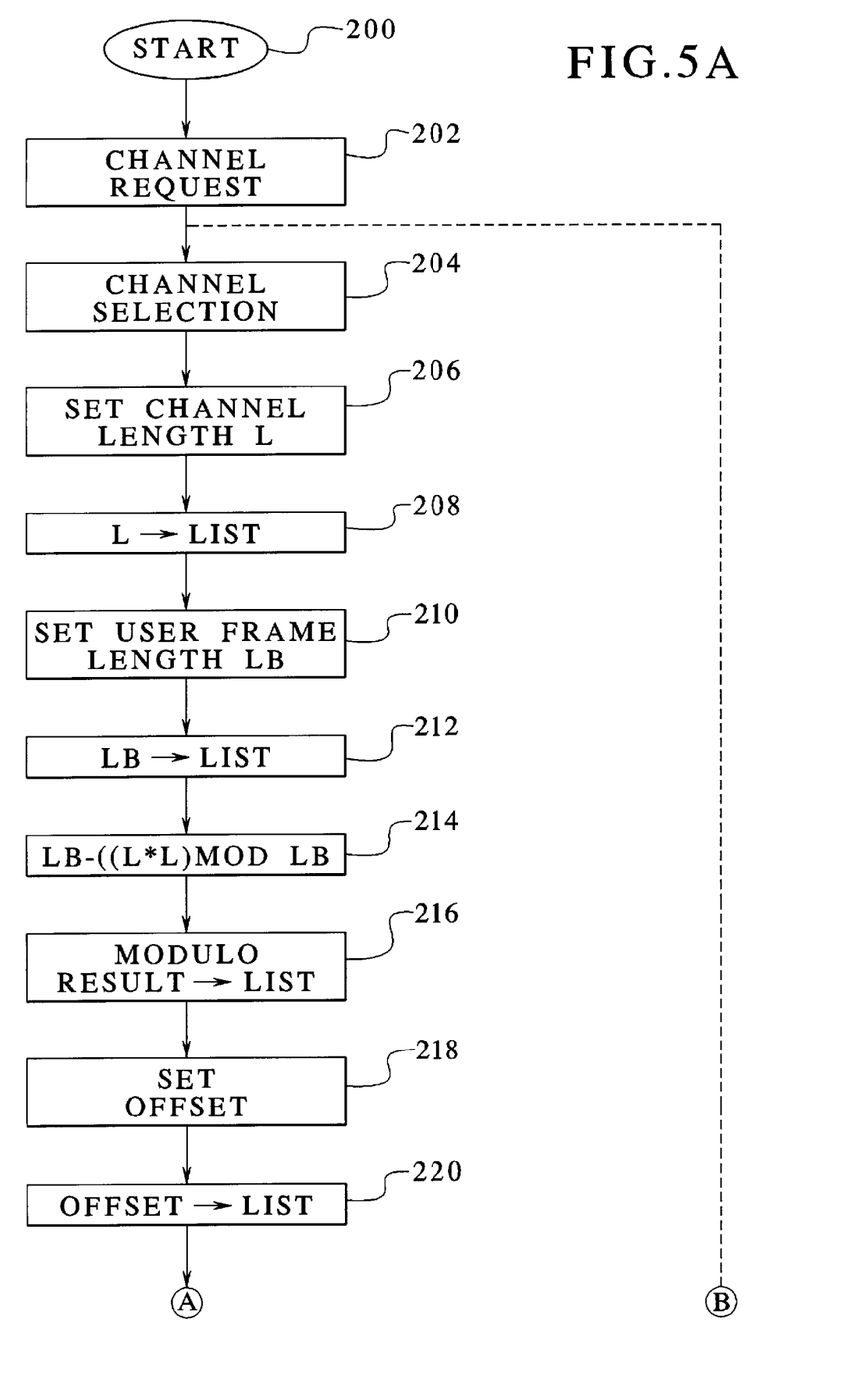
FIGS. 5a and 5b (combined) are a flow chart for a method for modifying the transmission parameters in accordance with the invention.
Figure 5B:
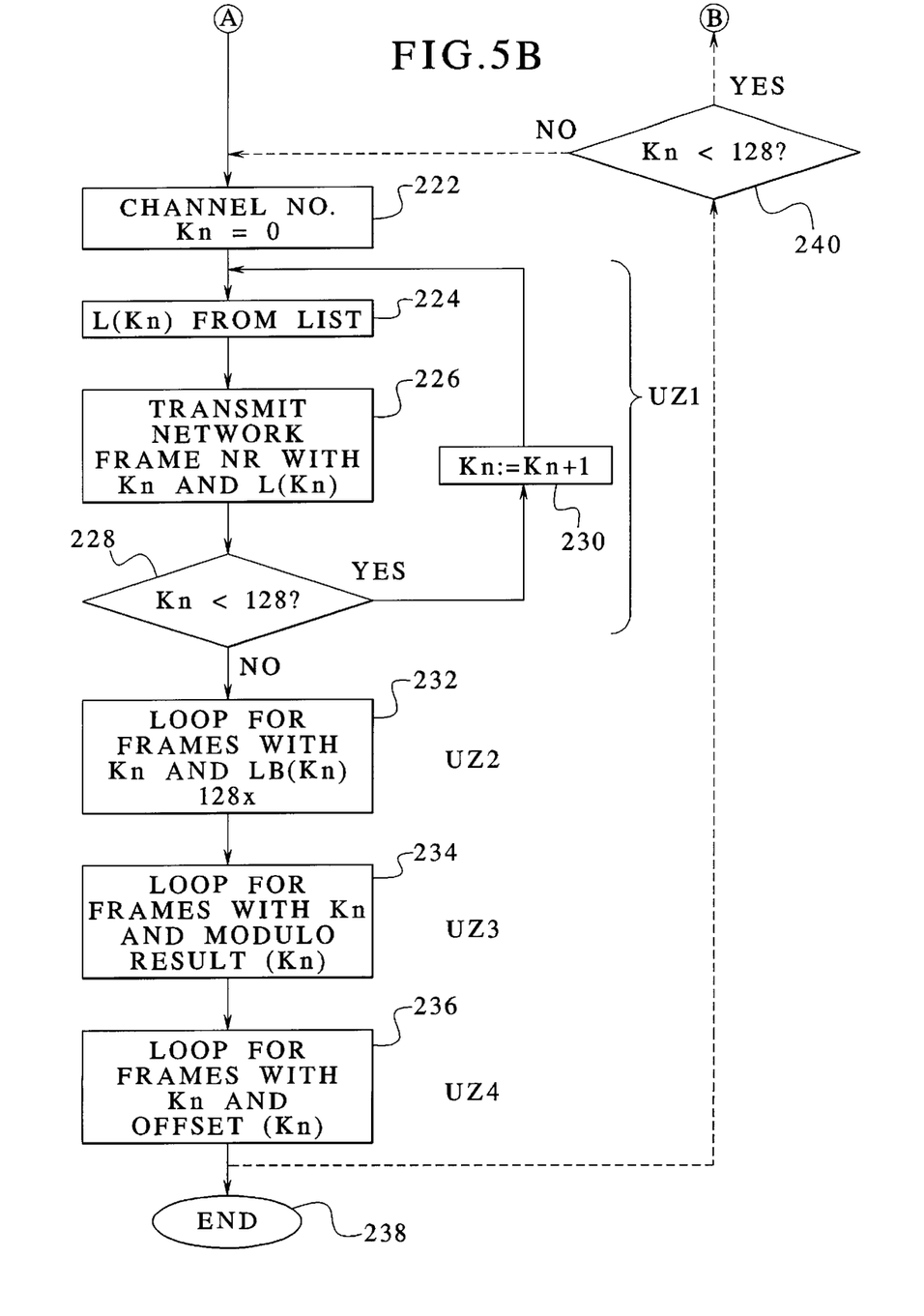

FIG. 4 shows two time curves 160 and 180 for illustrating the chronological succession of user frames BR in the case of the time curve 160 to the device and in the case of the time curve 180 from the device that is connected to the user unit 20 (see FIG. 1). At a point-in-time t1', the device is informed by the user unit 20—with the assistance of the synchronization pulse 162—that a user frame BRa was offered. The transmission protocol of the device is determined such that the device offers a user frame BR6 with an offset of X bit places. The user unit 20 can thus receive the user frame BRb at a point-in-time t2' and process it for further transmission. The offset of X bit places is also preserved between later points-in-time t3' and t4', or between points-in-time t5' and t6'. For example, such an offset occurs given a communication at the telecommunication interface SO known from the ISDN protocol (integrated services digital network). FIGS. 5a and 5b show a flow chart for a method for modifying the transmission parameters in the data transmission network 10 according to FIG. 1. In a step 200, the method begins with the initial commissioning of the data transmission network 10.

In a step 204 immediately following step 202, the control unit 12 assigns a useful channel to the device. The control unit 12 determines the suitable channel length L for the allocated channel (step 206) on the basis of the device-specific identification number that is likewise communicated in the command part 62. In an immediately following step 208, the identified channel length L is entered into a list, for example a set of memory registers.

In a step 210, the control unit 12 subsequently determines the user frame length LB provided for the device, this being likewise stored in a list (step 212).

In a following step 214, the control unit 12 determines the modulo offset that was already explained above with reference to FIG. 3. This modulo offset is also stored in the list (step 216). The early calculation of the modulo offset, and thus the storage thereof as well, can be omitted if the modulo offset is calculated—for example, by a digital circuit—from the channel length, the user frame length and the number of network frames per cycle in a very short time for the respective channel, before it is then transmitted.

In a step 202, a channel request is generated by the device connected to the user unit 20. This channel request is communicated to the control unit 12 with the assistance of the command part 62 (see FIG. 2).

The modulo offset is calculated according to the following equation:

$$\text{Offset}=LB-(CL*L)\,MOD\,LB,$$

whereby CL is the number of network frames NR in a main cycle HZ explained below.

In a step 218, the control unit 12 also determines the offset—explained above with reference to FIG. 4—between user frame given input into and given output from the device. This offset is also stored in a list (step 220).

In a step 222 immediately following the step 220, a counter for the channel number Kn can be set to the value 0. A step 224 is subsequently implemented.

In step 224, the control unit 12 takes the channel length L of the useful channel Kn who se channel number Kn is contained in th e channel counter at the moment from the list for the channel length L.

In a following step 226, a network frame NR is transmitted, whereby the channel having the momentary channel number Kn is identified in the reference part 64 and whereby the channel length L of the identified channel Kn is indicated in the parameter data word 66 (see FIG. 2). Moreover, the two bit places s in the reference data word 64 (see FIG. 2) reference the first sub-cycle UZ1. A step 228 is implemented immediately following step 226.

A check is carried out in step 228 to determine whether the channel counter has a value that is lower than 128, i.e. the total number of useable useful channels. If this is the case, then step 228 is immediately followed by a step 230 in which the channel counter is incremented by the value "1". Subsequently, the method is continued in step 224.

The method is thus implemented in the sub-cycle UZ1 that contains the steps 224 through 230 and is only ended when it is found in step 228 that the channel length L was already identified for all useful channels. In this case, the next sub-cycle UZ2 immediately follows step 228.

The sub-cycle UZ2 is shown simplified in FIG. 5b by a block 232, having a procedure that corresponds to the procedure of the step 224 through 230. In the sub-cycle UZ2, the channel number Kn contained in the reference data word 64 in the bit places c (see FIG. 2) is incremented by the value "1" from network frame NR to network frame NR. The sub-cycle UZ2 is referenced in the bit places s of the reference data word 64. The user frame lengths LB respectively belonging to the channel Kn identified in the reference data word 64 are respectively indicated in the parameter data word 66 (see FIG. 2). The sub-cycle UZ2 is ended after 128 transmitted network frames NR and the method is continued with the sub-cycle UZ3 that is shown in a block 234.

In the sub-cycle UZ3, 128 network frames NR are again transmitted, one of the useful channels Kn as well as the modulo result for this useful channel Kn taken from the corresponding list being respectively communicated therein. The sub-cycle UZ3 is thereby identified in the bit places s of the reference data word 64 (see FIG. 2). The sub-cycle UZ3 is ended after 128 communicated network frames NR and the method is continued with the sub-cycle UZ4 (block 236).

In the sub-cycle UZ4, 128 network frames NR are communicated, one of the useful channels Kn being identified in the reference data word 64 therein. The offset that was identified in Step 218 and that belongs to the referenced useful channel Kn is located in the parameter data word 66. After 128 transmitted network frames NR in the sub-cycle UZ4, this is ended and the method is continued in step 238.

The method is ended in step 238, by virtue of the communicated transmission parameters being employed for the communication. Setting the bit places c in the reference data word 64 (see FIG. 2), that function as a counter, to the value "0" is employed for that purpose. When this counter value set to "0" is recognized by the user units 14 through 26 (see FIG. 1) they "know" that the communicated transmission parameters are now to be employed for the transmission.

In another exemplary embodiment of the invention, the main cycle HZ composed of the sub-cycles UZ1 through UZ4 is cyclically repeated. In this case, the step 236 is followed by a step 240 instead of the step 238. A check is carried out in this step 240 to determine whether modifications in the transmission parameters are required, for example when a further device needs a useful channel or when a device in turn releases (frees) its useful channel. If modifications are not required, then the step 240 is immediately followed by the step 222. When, by contrast, modifications are required, then the step 240 is followed by the step 204.

Figure 6:
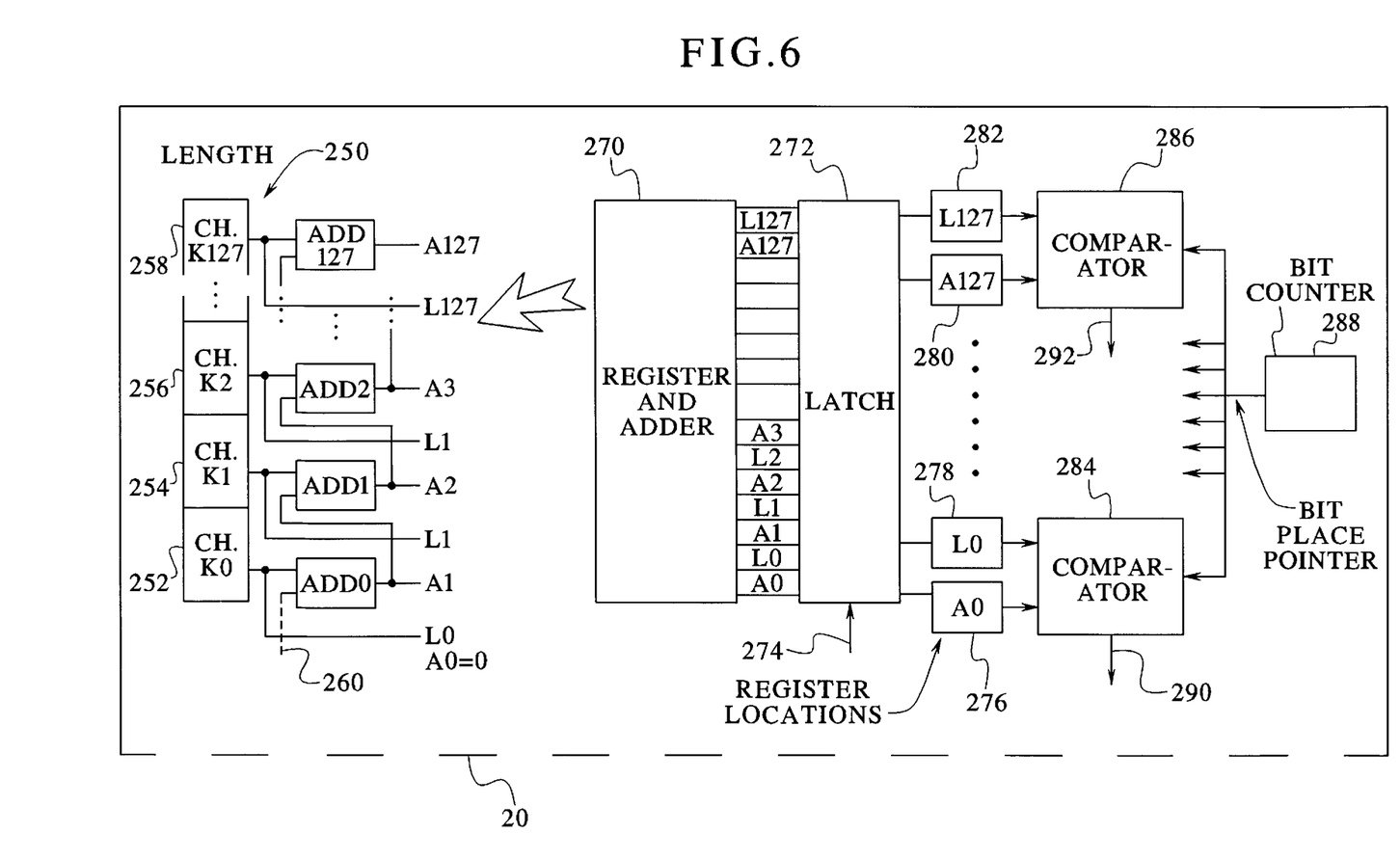
FIG. 6 is a block diagram of the units for modifying the transmission parameters in a user unit in accordance with the invention.

FIG. 6 shows a schematic illustration of the assemblies employed when modifying the transmission parameters in the user unit 20. A register set 250 contains 128 register places, four register places 252 through 258 being shown in FIG. 6. The respective register places 252, 254 and 256 are employed for storing the channel lengths L0, L1 and L2 of the respective useful channel K0, K1 and K2 communicated from the control unit 12 in the first sub-cycle UZ1. The length L127 of the useful channel K127 is stored in the register location 258. An adder ADD 0 that calculates the start address A1 of the useful channel K1 in the network frame NR is arranged at the output of the register location 252. The start address A0 of the useful channel K0 can be freely prescribed by means of a further input 260 of the adder ADD 0. The address A1 at the output of the adder ADD 0 serves as the basis for the calculation of the start address of the following useful channel K2 in the network frame NR. To that end, the channel length L1 of the adder K1 for the address A1 which is stored in the register location 254 is added to the address value A1 in an adder ADD 1. The start address of the useful channel K2 is emitted at the output of the adder ADD 1. Further adders ADD 2 through ADD 127 calculate the start address of the useful channels K3 through K127 in an analogous way.

From the output of each register location 252 through 258, a channel length L0 through L127 stored in the respective register location 252 through 258 is taken via a line, so that it is available for the further processing. The register 250 and the adders ADD 0 through ADD 127 are combined in a register set/adder block 270 in the right part of FIG. 6, this having the outputs A0 through A120 and L0 through L127 that are connected to an electrical switch block 272 at the input side. The switch block 272 switches the output lines A0 through A127 and L0 through L127 of the register-adder block 270 through to register locations 276 through 282 for storing the addresses A0 through A127 or the lengths L0 through L127 when a control signal is present at a line 274. This through-connection is implemented at the end of the main cycle HZ. A comparator—comparators 284 and 286 being shown in FIG. 6—is respectively connected to the output of the register locations 276 through 282 belonging to one of the useful channels K0 through K127.

The comparator 284 is connected to the register location 276 for the address A0 of the useful channel K0 and to the register location 278 for the length L0 of the useful channel K0. Analogously thereto, the comparator 286 is connected to the register location 280 for the address A127 of the useful channel K127 and to the register location 282 for the length L127 of the useful channel K127. The comparator 284 compares the address A0 to a bit address generated with a bit counter 288 for counting the bit locations in the network frame NR that were already communicated. As soon as the bit counter 288 reaches an address that coincides with the address A0, a control signal for a multiplexer is generated at the output of the comparator on a line 290, this being effective until the bit counter 288 reaches an address that corresponds to an address A0+L0. The signal on the line 290 assures that the useful data of the device transmitted on the channel K0 also in fact proceed in the network frame NR to the bit places in the network frame NR provided therefor.

The comparator 228 compares the address of the bit counter 288 to the address A127 and generates a control signal on a line 292 when the bit counter 288 reaches the address A127. The control signal on the line 292 remains effective until the bit counter 288 reaches an address that corresponds to the sum of the address 127 and the length L127. The signal on the line 292 assures that a demultiplexer is through-connected exactly to the device that receives data in the useful channel K127.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for operating a digital data transmission network containing a control unit connected to at least one user unit, said user unit having a plurality of channels, said method comprising the steps of:

(a) in an initial part of a transmission event between said control unit and said at least one user unit, communicating a first data block containing data and a second data block containing data from said control unit to said at least one user unit;

(b) in said control unit, prescribing a first transmission parameter in said first data block identifying a first reference number of bit places indicating a number of bit places provided for subsequent data transmission of the data contained in said first block from said at least one user unit in a first of said channels;

(c) in said control unit, prescribing a second transmission parameter in said second data block identifying a second reference number of bit places indicating a number of bit places provided for subsequent data transmission of the data contained in said second block from said at least one user unit in a second of said channels;

(d) communicating said first data block and said second data block from said control unit to said at least one user unit and storing said first reference number and said second reference number in said at least one user unit; and (e) following an end of said transmission event, employing the number of bit places indicated by said first reference number for said data transmission in said first channel and employing the number of bit places indicated by said second reference number for said data transmission in said second channel.

2. A method as claimed in claim 1 comprising the additional steps of:

in said control unit, designating in said first data block a channel, among said plurality of channels, to be used for transmitting the data contained in said first data block; and in said control unit, designating in said second data block the a channel, among said plurality of channels, to be used for transmitting the data contained in said second data block.

3. A method as claimed in claim 1 comprising the additional step of arranging said control unit and said at least one user unit in a ring network wherein said first and second data blocks are transmitted in a single direction around said ring network.

4. A method as claimed in claim 3 wherein a plurality of simultaneously transmitted bit places in said ring network is equal to a predetermined number of bit places in each data block.

5. A method as claimed in claim 3 wherein said at least one user unit has a delay associated therewith and wherein a transmission time exists between two successive transmitted bit places of a data block, said delay being approximately equal to said transmission time.

6. A method as claimed in claim 1 comprising the additional steps of, in a second part of said transmission event:

in said control unit, prescribing a third transmission parameter in said first data block indicating a number of bit places for a user frame in said data transmission in said first channel; and in said control unit, prescribing a fourth transmission parameter in said second data block indicating a number of bit places for a user frame in said data transmission in said second channel.

7. A method as claimed in claim 6 comprising the additional steps of, in a third part of said transmission event:

in said control unit, prescribing a first modulo value as a fifth transmission parameter indicating a whole-numbered remainder of a division of a total number of data blocks in said transmission event by a product of a length of said user frame in said first channel and a bit place number in said first channel; and in said control unit, prescribing a second modulo value as a sixth transmission parameter indicating a whole-numbered remainder of a division of said total number of data blocks in said transmission event by a product of a length of said user frame in said second channel and a bit place number in said second channel.

8. A method as claimed in claim 7 comprising the additional steps of, in a fourth part of said transmission event:

in said control unit, prescribing a first bit place plurality as a seventh transmission parameter in said first data block indicating an offset between an input data word and an output data word in said first channel; and in said control unit, prescribing a second bit place plurality as an eighth transmission parameter in said second data block indicating an offset between an input data word and an output data word in said second channel.

9. A method as claimed in claim 8 comprising the additional step of, in said control unit, including a data word in said first data block identifying which of said first, second, third or fourth part of said transmission event is currently being transmitted.

10. A method as claimed in claim 1 comprising the additional step of cyclically repeating steps (a), (b), (c), (d) and (e).

11. A method as claimed in claim 1 wherein said at least one user unit has an unused channel, and comprising the additional step of employing a reference number of bit places equal to zero for said unused channel.

12. A digital data transmission network comprising:

a control unit connected to at least one user unit, said user unit having a plurality of channels;

means in said control unit for, in an initial part of a transmission event between said control unit and said at least one user unit, communicating a first data block containing data and a second data block containing data from said control unit to said at least one user unit;

means in said control unit, for prescribing a first transmission parameter in said first data block identifying a first reference number of bit places indicating a number of bit places provided for data transmission of the data contained in said first data block from said at least one user unit in a first of said channels;

means in said control unit for prescribing a second transmission parameter in said second data block identifying a second reference number of bit places indicating a number of bit places provided for data transmission of the data contained in said second data block from said at least one user unit in a second of said channels;

means for, after said first data block and said second data block are communicated from said control unit to said at least one user unit and storing said first reference number and said second reference number in said at least one user unit; and means in said at least one user unit for, following an end of said transmission event, employing the number of bit places indicated by said first reference number for data transmission in said first channel and employing the number of bit places indicated by said second reference number for data transmission in said second channel.

13. A data transmission network as claimed in claim 12 wherein said at least one user unit contains a memory for each channel for storing the reference number of bit places for that channel.

14. A data transmission network as claimed in claim 13 wherein said at least one user unit further comprises a plurality of adders connected at an output of said memory between said memory and each channel, said plurality of adders including a first adder, with each adder in said plurality of adders, except said first adder, having a further input connected to an adder for a neighboring channel.

15. A data transmission network as claimed in claim 14 wherein said at least one user unit further comprises an intermediate memory having an input connected between said memory and said plurality of adders.

* * * * *